United States Patent [19]

Pellicori et al.

[11] 4,282,290

[45] Aug. 4, 1981

[54] HIGH ABSORPTION COATING

[75] Inventors: Samuel F. Pellicori, Santa Barbara, Calif.; Milton H. Monnier, Beaverton, Oreg.

[73] Assignee: The United States of America as represented by the Secretary of the Air Force, Washington, D.C.

[21] Appl. No.: 114,541

[22] Filed: Jan. 23, 1980

[51] Int. Cl.³ .............................................. B32B 15/04
[52] U.S. Cl. ................................ 428/472; 204/192 P; 350/164; 427/35
[58] Field of Search .......................... 428/472; 427/35; 204/192 P; 350/164, 165

[56] References Cited

U.S. PATENT DOCUMENTS

| | | |
|---|---|---|
| 3,271,179 | 9/1966 | Smith ..................................... 427/35 |
| 3,655,438 | 4/1972 | Sterling et al. .............. 204/192 P X |
| 3,984,581 | 10/1976 | Dobler et al. .......................... 427/35 |
| 3,992,164 | 11/1976 | Fengler ............................. 427/35 X |

Primary Examiner—Thomas J. Herbert, Jr.
Attorney, Agent, or Firm—Donald J. Singer; William J. O'Brien

[57] ABSTRACT

A coating system characterized by a high degree of absorption of infrared energy and composed of a thin first layer of aluminum oxide, a thin, semitransparent second layer of titanium, a third dielectric layer of aluminum oxide and an opaque fourth layer of titanium.

1 Claim, 3 Drawing Figures

HIGH ABSORPTION COATING

STATEMENT OF GOVERNMENT INTEREST

The invention described herein may be manufactured and used by or for the Government for governmental purposes without the payment of any royalty thereon.

BACKGROUND OF THE INVENTION

This invention relates to a reflectance control coating system. More particularly, this invention concerns itself with a coating system which exhibits high absorptance with transmittance and reflectance neaar zero for infrared energy.

A problem often encountered in the utilization of detector arrays involves the creation of undesirable optical crosstalk between the individual detectors within the array. Previous attempts at overcoming this problem involved the use of black paints in order to provide proper reflectance control. Unfortunately, the so called black paints are susceptible to outgassing or particle shedding in vacuum. Also, these coatings do not possess the high degree of absorption necessary to effectively control the undesirable optical crosstalk encountered when using detector arrays.

Another method suggested for controlling the crosstalk problem utilized a coating system design based on the use of silicon monoxide, chromium and opaque alminum. This system was optimized for absorption in the visible spectrum and reflection in the infrared spectrum. However, since this system exhibited a low infrared emittance and high visible absorbance, it did not function with the degree of efficiency needed to prevent optical crosstalk between the detectors. Furthermore, chromium coatings exhibit high stress and lack stability during time, humidity and thermal cycling processing procedures.

With the present invention, however, it has been found that a coating system composed of an opaque layer of titanium onto which is deposited a dielectric layer composed of a quarter wave optical thickness (QWOT) of alumina, followed by the deposition of a thin, semitransparent layer of titanium plus a final QWOT of alumina overcomes the problems of prior art systems and provides a coating system characterized by high absorption and near zero reflectance in the infrared range. The system is especially adaptable for application to refractory substrates, such as sapphire. The coating achieves its effective high absorption by trapping radiation within a resonant cavity constructed from the highly reflective opaque titanium layer and the semitransparent titanium layer, which also absorbs radiation at each bounce. A final anti-reflective layer fabricated from the same aluminum oxide material and same QWOT as the intermediate dielectric layer is deposited onto the semitransparent titanium layer.

SUMMARY OF THE INVENTION

In accordance with this invention, it has been found that a multilayer coating system characterized by a high absorbency in the infrared spectrum and especially adapted for application to the surfaces of a sapphire substrate is effective in preventing optical crosstalk problems. The design consists of an opaque layer of titanium onto which is deposited a quarter-wave optical thickness of alumina, followed by a semitransparent layer of titanium plus a final layer of alumina. The intermediate semitransparent titanium layer thickness is critical. It has been found that the optimum thickness which achieves the best performance is a thickness of about 140 A thick.

The coating system of the invention achieves its high absorption by trapping radiation within a resonant cavity constructed from the highly reflecting opaque layer and the semitransparent metal layer, which also absorbs radiation at each bounce. A final antireflection layer of a QWOT of alumina, increases the amount of radiation trapped in the layers.

Accordingly, the primary object of the invention is to provide a system which overcomes the problem of optical cross-talk that occurs when using infrared detector arrays.

Another object of this invention is to provide a coating system which exhibits a high degree of absorbency for infrared energy.

Still another object of the invention is to provide a coating system particularly adapted for application to the surfaces of a sapphire substrate.

A further object of this invention is to provide a coating system composed of an opaque, highly reflective, fourth layer of titanium, a thin, semitransparent second layer of titanium and a dielectric, third layer of aluminun oxide positioned between and in contact with said fourth and second layers plus a first top layer of aluminum oxide.

The above and still further objects and advantages of the present invention will become more readily apparent upon consideration of the following detailed description thereof when viewed in conjunction with the accompanying drawings.

DESCRIPTION OF THE PREFERRED EMBODIMENTS

Figure 1:
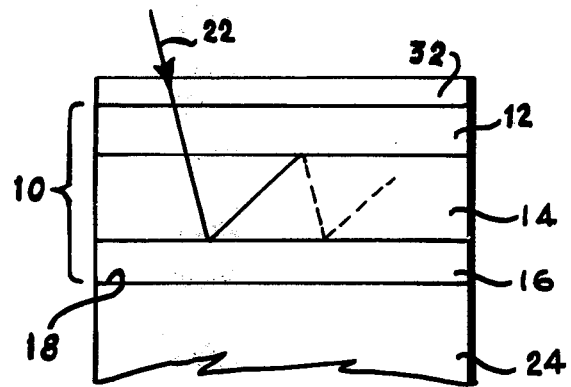
FIG. 1 is a schematic view in simplified and exaggerated form of the coating system of this invention applied to the top surface of a sapphire substrate to form a first surface reflector.

Pursuant to the above-defined objects, the present invention concerns itself with a multilayer coating system that exhibits a high degree of absorption of infrared energy. The coating system is especially adapted for application to the surfaces of a sapphire substrate. It is environmentally more stable and lends itself more readily to pattern etching than the systems relied on heretofore. Also, it has proven to be effective in overcoming the optical cross-talk problems encountered when using the large focal plane assemblies which form an important part of the many new infrared surveillance or imagery systems presently in use.

These assemblies comprise large mosaics or long linear arrays of crystal detectors. For sensors which use a single detector, there is no possibility of optical cross talk between detectors, but there is from the highly reflective metal contacts. Therefore, masking the detector with the herein described absorption coating is very effective. However, with increases in telemetry capacities, reliance is now made on the use of arrays consisting of a large number of detectors. This give rise to the problem of optical crosstalk. Optical crosstalk can be defined as the presence of an unwanted signal energy impinging on any detector signal in an array other than the one being interrogated. Many attempts have been made to control and minimizes to some extent the effects of optical crosstalk such as the use of apertures in front of the detectors, ray control mirrors behind the detectors and coating systems, such as the black paint technique and the multilayer coating technique.

A common design used a reflectance control surface which comprised a first layer of opaque chromium or aluminum, over which a quarter-wave optical thickness of silicon monoxide was deposited, then a semitransparent layer of chromium followed by an antireflecting (quarter-wave) layer of silicon monoxide.

It was possible to theoretically achieve a reflectance in-hand of <2% as seen from air (first surface) and <8% as seen through sapphire (second surface). The minimum reflectance or maximum absorption achievable is determined by the optical constants and thickness of the constituents. It is highly sensitive to the thickness of the semitransparent metal layer.

The design of the multilayer coating system of this invention consists of an opaque layer of titanium onto which is deposited a quarter-wave optical thickness of alumina, followed by a semitransparent layer of titanium about 110 to 150 A thick and a final quarter-wave optical thickness of aluminia to form a four layer system. The intermediate titanium layer thickness is critical. It has been found that an optimum thickness of 140 Å achieves the best performance.

The coating achieves its high absorption by trapping radiation within a resonant cavity constructed from and bounded by the highly reflective opaque layer and the semitransparent metal layer, which also absorbs radiation at each bounce. A final antireflection layer increases the amount of radiation trapped in the layers.

The new coating is prepared by a conventional vacuum deposition process, utilizing a multi-hearth electron beam gun for evaporating the titanium and alumina sequentially in a single vacuum pumpdown cycle. The proper desired characteristics of the latter material (alumina) are obtained by the deposition process wherein a partial pressure of oxygen is added.

As previously stated, a prior art method for overcoming crosstalk consisted of the application of black paint. Black paint has several shortcomings; namely, the total reflectance is never less than about 4%. It is impossible to delineate small specific shapes and sharp edges (such as a 0.002 by 0.002 in. detector). The absorption is not wavelength selective; i.e., excessive heating can occur. Paints are less desirable for vacuum applications because of the outgassing of volatiles and paints scatter radiation into a large solid angle.

The vacuum deposited absorption coating of this invention, however, overcomes these shortcomings because it can have a specular reflectance value below 0.5% over a specific narrowband of wavelengths. Thus, the residual radiation is under perfect control. Through appropriate masking before vacuum deposition, specific shapes having well defined edges can be coated. The materials are deposited in a high vacuum and have low vapor pressures, thus they will not outgas in spaceflight applications. The coating system achieves these properties by nature of its being a resonant degenerative cavity in which radiation falling in a specific narrow wavelength band is trapped by multiple reflections and absorbed. Radiation outside this band is reflected. While the dispersion pattern of the residual reflected energy is determined by the roughness of the substrate, it is preferable in and around detector arrays to employ a smooth substrate so that the direction of the residual reflectance (0.5%) beam is known. Unlike black paints, the coating of this invention is not susceptible to outgassing or particle shedding in vacuum, and is more absorbent. Besides the high absorption (>99.6%) obtained with these materials, they are easily etched. Thus, windows or other patterns can be produced to admit radiation where desired.

The "sapphire substrate" does not form part of the coating per se; however, the coating materials in terms of index, physical properties (thermal expansion and adhesion), and thicknesses are designed particularly in this application to fit a sapphire ($Al_2O_3$ crystal) substrate.

The sapphire substrate must be clean and the process of cleaning includes the conventional use of a detergent scrub and untrasonic agitation; boiling nitric acid; a rinse in deionized water and a nitrogen blow dry; and a final oxygen plasma cleaning just prior to insertion into the deposition system (glow discharge in the vacuum system may be substituted for the plasma cleaning step).

The coating materials are deposited by conventional electron beam deposition and the particular source utilized was an AIRCO Temescal Model STIH-270-2, a 4 inch crucible source using a rotating planetary substrate holding system. The substrate was pre-heated for 30 minutes at 100° C. with a normal background pressure prior to deposition of $2.0 \times 10^{-5}$ torr. The initial semitransparent titanium layer (140 A) thickness is very critical for reflectance magnitude control. A crystal rate monitor (INFICON) was used for thickness/rate control. The $Al_2O_3$ deposition was accomplished reactively in oxygen (total pressure—$4.0 \times 10^{-6}$ torr.). This thickness is critical in controlling wavelength positioning with a quarter wave optical thickness (QWOT) at 2.8 $\mu$m (micrometers) being utilized. The final opaque titanium layer is non-critical with respect to thickness and the thickness may vary by orders of magnitude, depending on the intended application.

Referring now to the drawings, there is disclosed, in greater detail the coating system of this invention. FIG. 1 shows a coating sytem 10 composed of a QWOT of aluminum oxide 32, a very thin titanium layer 12 having a thickness of 140 A and an index value of N=4.6–i5.6 in comparison to air which has an index value of 1.00. The layer 12 is positioned next to layer 14 composed of aluminum oxide and having a thickness of 4250 Å and a dielectric index of 1.65 which in turn is positioned next to and in contact with an opaque titanium layer 16 of from about 2000 Å to 3000 Å thick. The coating system 10, as shown in FIG. 1, has been applied to the top surface 18 of a sapphire substrate 24, thus forming a first surface reflector. As can be seen in FIG. 1, infrared energy in the form of a ray 22 is trapped within a resonant cavity formed by the highly reflective opaque layer 16 and the semi-transparent layer 12 which also absorbs radiation at each bounce. The coating system 10 achieves this effect by reason of its being a resonant degenerative cavity in which ray 22 falling in a specific narrow wavelength band is trapped by multiple reflections and absorbed.

Using published indices for titanium, the optimum thickness for the semitransparent layer is 140 Å. A tolerance of 10 Å produces an increase of about 0.002 reflectance, depending on the departure of the index from ideal If the titanium layer is 140 Å thick, the variation of the reflectance at 2.80 μm with dielectric index is shown in Table I for various materials.

TABLE I

| Dielectric Index n | Dielectric Material | t(μm) | R(2.8 μm, Second Surface i.e. includes a sapphire/air interface reflectance = 0.068) |
|---|---|---|---|
| 1.65 | $SiO_x$ or $Al_2O_3$ | 0.425 | .071 |
| 2.00 | $Bi_2O_3$ | 0.340 | .073 |
| 2.10 | $CeO_2$ | 0.333 | .075 |
| 2.40 | $As_2S_3$ | 0.292 | .087 |
| 2.40 | $As_2S_3$ | 0.250 | .082 |

From the R values of Table I, the reflectance of the first sapphire surface (=0.068) must be subtracted. Table I gives R vs λ for $CeO_2$. When Chromium is used, comparable R-values are obtained if the assumed index for Chromium is 6.00–i16.00. Thus, 0.010 μm 0.001 μm thickness with n=1.65 gives R(2.8)=0.072. If n(diel.)=1.75, R(2.8)=0.12. More accurate index values for Chromium are not available in the open literature. Chromium also has extremely high stress (10000 Kg/cm² for 0.1 μm, 2000 Kg/cm² for 100 Å). Since titanium is more desirable when etching, deposition experience, and optical constants are considered, it is recommended over nickel or chromium. Because $CeO_2$ (or $Bi_2O_3$) is a relatively easy material to work with, it is recommended over $SiO_x$ (whose index is very sensitive to deposition conditions, especially chamber pressure).

Figure 2:
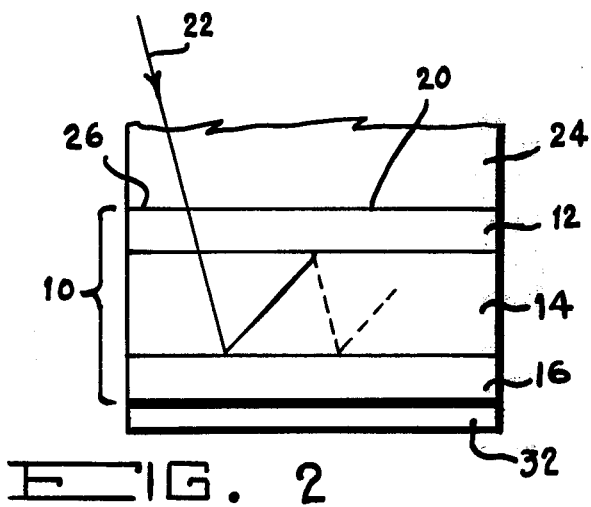
FIG. 2 is similar to FIG. 1 except that the coating system of this invention is applied to the bottom surface of a sapphire substrate to form a second surface reflector.
Figure 3:
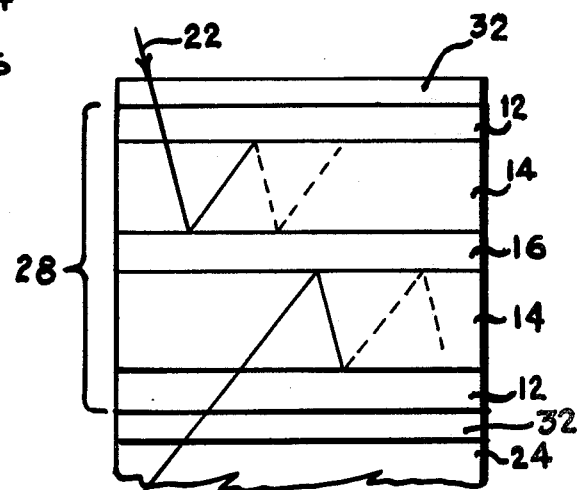
FIG. 3 illustrates the coating system of this invention utilized as both a first and second surface reflector with two stacks of the coating system of this invention placed back to back and sharing a common opaque titanium layer.

FIG. 2 discloses the coating system 10 applied to the bottom surfacing 26 of sapphire substrate 24 and forms a second surface reflector. Second surface reflector refers to the absorption coating applied to the bottom surface of a substrate so that the light which passes through the upper (first) surface will see the absorption coating. A first surface reflector refers to the first surface encountered by the light rays. For second surface reflection use through the sapphire, the order of its coating is reversed and the thin titanium surface 12 is deposited first followed by the dielectric layer 14, the opaque titanium layer 16 and the dielectric layer 32. As shown in FIG. 3, the coating 10 can be placed back to back to form a coating assembly 28 which shares a common opaque titanium layer 16 thus forming both a first and second reflector in the same assembly which in turn can be applied to the surface of a sapphire substrate 24.

The prior art system which used a thermal control (low infrared emittance and high visible absorance) design based on the use of silicon monoxide, chromium and opaque aluminum, was optimized for absorption in the visible and reflection in the infrared. The present invention uses alumina for the dielectric, titanium for the semi-transparent (absorbing layers) and titanium for the opaque layer. The properties of these materials result in an absorption coating which is environmentally more stable and lends itself readily to pattern etching. Furthermore, the coating of this invention is specified for absorption of infrared energy and the control of reflection within detector arrays to prevent optical crosstalk among detectors. The present invention has a similar structure, as that of the prior art, but uses different materials. With it, a reflectance minimum of 0.4% is achieved for the second surface, and well <2% for the first surface average reflectance in a 0.2 μm bandwidth.

Unlike previous coatings using chromium, which has extremely high stress, the coating system of this invention is stable with respect to time and with respect to humidity and thermal cycling procedures. The proper vacuum conditions and control conditions for depositing the thin metal layer, as well as the other layers, were derived empirically.

Although the principle of this invention has been pointed out with particularity, it should be understood by those skilled in the art that various alterations and modifications can be made without departing from the spirit of the invention, the scope of which is defined by the appended claims.

What is claimed is:

1. A multilayer coating system for the absorption of infrared energy and particularly adapted for application to a sapphire substrate which consists essentially of:
    (A) A vacuum deposited, opaque, first layer of titanium about 2000 to 3000 Å in thickness;
    (B) A vacuum deposited, semitransparent, third layer of titanium about 140 Å in thickness;
    (c) A vacuum deposited, dielectric, second layer of aluminum oxide about one quarter wave optical thickness at 2.8 micrometers positioned between and in contact with said first and third layers; and
    (d) a vacuum deposited, dielectric, fourth layer superposed on said third layer.

* * * * *